(12) United States Patent
Zhao

(10) Patent No.: US 12,402,180 B2
(45) Date of Patent: Aug. 26, 2025

(54) INFORMATION PROCESSING METHOD AND TERMINAL

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 542 days.

(21) Appl. No.: 17/790,654

(22) PCT Filed: Dec. 28, 2020

(86) PCT No.: PCT/CN2020/139947
§ 371 (c)(1),
(2) Date: Jul. 1, 2022

(87) PCT Pub. No.: WO2021/136145
PCT Pub. Date: Jul. 8, 2021

(65) Prior Publication Data
US 2023/0038833 A1    Feb. 9, 2023

(30) Foreign Application Priority Data

Jan. 3, 2020   (CN) .......................... 202010006879.6

(51) Int. Cl.
*H04W 76/11*   (2018.01)
*H04L 1/08*    (2006.01)
*H04W 76/14*   (2018.01)

(52) U.S. Cl.
CPC .............. *H04W 76/11* (2018.02); *H04L 1/08* (2013.01); *H04W 76/14* (2018.02)

(58) Field of Classification Search
CPC ..... H04W 76/11; H04W 76/14; H04W 76/22; H04L 1/08
See application file for complete search history.

(56) References Cited

U.S. PATENT DOCUMENTS

| 2018/0368132 A1 | 12/2018 | Babaei et al. |
| 2019/0254062 A1 | 8/2019 | Wu et al. |

(Continued)

FOREIGN PATENT DOCUMENTS

| CN | 110139322 A | 8/2019 |
| CN | 110139369 A | 8/2019 |

(Continued)

OTHER PUBLICATIONS

Extended European Search Report for the corresponding European Patent Application No. 20910550.1 issued on Apr. 28, 2023.

(Continued)

*Primary Examiner* — Chae S Lee
(74) *Attorney, Agent, or Firm* — Ladas & Parry, LLP

(57) ABSTRACT

An information processing method and a terminal are provided, so as to solve a problem how to implement duplication of a sidelink communication interface when SLRB configuration is configured or preconfigured by a network and LCID is selected by the terminal. The method includes: obtaining target information, where the target information is configured to configure a PDCP duplication for a SLRB; determining a quantity of RLC entities corresponding to the SLRB PDCP duplication according to the target information; and determining a LCID corresponding to each RLC entity according to the quantity of the RLC entities corresponding to the SLRB PDCP duplication.

19 Claims, 6 Drawing Sheets

(56) References Cited

U.S. PATENT DOCUMENTS

| | | | |
|---|---|---|---|
| 2020/0008266 A1* | 1/2020 | Pan | H04L 1/1642 |
| 2021/0345178 A1* | 11/2021 | Shi | H04L 5/0055 |
| 2021/0352525 A1* | 11/2021 | Hong | H04L 1/1614 |
| 2022/0217575 A1* | 7/2022 | Wang | H04W 28/0268 |
| 2022/0232372 A1* | 7/2022 | Wang | H04W 8/22 |
| 2022/0408504 A1* | 12/2022 | Yilmaz | H04W 72/02 |

FOREIGN PATENT DOCUMENTS

| | | |
|---|---|---|
| EP | 3589066 A1 | 1/2020 |
| WO | 2019061182 A1 | 4/2019 |
| WO | 2019061194 A1 | 4/2019 |
| WO | 2021136145 A1 | 7/2021 |

OTHER PUBLICATIONS

"Consideration on Data Duplication Design for PC5 CA", 3GPP TSG-RAN WG2 Meeting #100, R2-1713071, Reno, USA, Nov. 27-Dec. 1, 2017, Source: ZTE, Agenda Item: 9.10.2, all pages.

"Packet duplication in CA-based eV2x," 3GPP TSG-RAN2 Meeting 3101, R2-1801856, Athens, Greece, Feb. 26-Mar. 2, 2018, Agenda ITem: 9.10.2,. Source: OPPO, all pages.

International Search Report for PCT Application PCT/CN2020/139947 issued on Mar. 25, 2021, and its English Translation provided by WIPO.

Written Opinion for PCT Application PCT/CN2020/139947 issued on Mar. 25, 2021, and its English Translation provided by WIPO.

Internationally Preliminary Report on Patentability for PCT/CN2020/139947 issued on Jul. 5, 2022, and English translation provided by WIPO.

"Packet duplication in CA-based eV2x," 3GPP TSG-RAN2 Meeting #99, R2-1707699, Berlin, Germany, Aug. 21-25, 2017, Agenda Item: 9.10.2, Source: OPPO, all pages.

"Discussion on duplication in eV2x mode-4," 3GPP TSG-RAN2 Meeting #101bis, R2-1804361 revision of R2-1801852, Sanya, China, Apr. 16-Apr. 20, 2018, Agenda Item: 9.10.2, Source: OPPO, all pages.

First Office Action and search report for Chinese Patent Application 202010006879.6 issued by the Chinese Patent Office on Jun. 1, 2022, and its English translation provided by Global dossier.

"Consideration on Packet Duplication over Sidelink," 3GPP TSG-RAN WG2#101, R2-1801983, Athens, Greece, Feb. 26-Mar. 2, 2018, Agenda item: 9.10.2, Source: Potevio, all pages.

"Packet duplication indication for PC5," 3GPP TSG-RAN WG2 Meeting#101, R2-1802005, Athens, Greece, Feb. 26-Mar. 2, 2018, Source: vivo, Agenda Item: 9.10.2, all pages.

"PDCP duplication for eV2X," 3GPP TSG-RAN WG2 #101, R2-1802116, Athens, Greece, Feb. 26-Mar. 2, 2018, Source: CATT, Agenda Item: 9.10.2, all pages.

"Discussion on PDCP impact for PDCP duplication," 3GPP TSG-RAN2 Meeting #101, R2-1802677, Athens, Greece, Feb. 26-Mar. 2, 2018, Agenda item: 9.15, Source: Huawei, HiSilicon, all pages.

"UE sidelink configuration for NR V2X," 3GPP TSG-RAN WG2 Meeting 106, R2-1906431 (Revision of R2-1903660), Reno, USA, May 13-17, 2019, Agenda item: 11.4.5, Source: Intel Corporation, all pages.

\* cited by examiner

INFORMATION PROCESSING METHOD AND TERMINAL

CROSS-REFERENCE TO RELATED APPLICATIONS

The present application is the U.S. national phase of PCT Application No. PCT/CN2020/139947 filed on Dec. 28, 2020, which claims a priority of to Chinese patent application No. 202010006879.6 filed on Jan. 3, 2020, the disclosures of which are incorporated herein by reference in their entireties.

TECHNICAL FIELD

The present disclosure relates to the field of communications technologies, and in particular, to an information processing method and a terminal.

BACKGROUND

In order to meet the requirements of a sidelink communication interface for high-reliability and low-delay services, a Packet Data Convergence Protocol (PDCP) duplication technology of the sidelink communication interface is introduced in the related art. The PDCP duty, i.e., a Radio bearer of the PDCP layer, corresponds to a PDCP entity, and is transmitted through multiple Logical Channels (LCs) in a Radio Link Control (RLC) layer, where each Logical Channel corresponds to an RLC entity.

At present, since the configuration of Sidelink Radio Bearer (SLRB) is configured or preconfigured by the network, and the LCID is selected by the terminal, how to implement duplication of the sidelink communication interface under this situation becomes a problem to be solved urgently.

SUMMARY

The present disclosure provides an information processing method and a terminal, so as to solve a problem how to implement duplication of a sidelink communication interface when SLRB configuration is configured or preconfigured by a network and LCID is selected by the terminal.

In order to achieve the above object, an information processing method is provided in the present disclosure, applied to a first terminal, including:
  obtaining target information, where the target information is configured to configure a Packet Data Convergence Protocol (PDCP) duplication for a Sidelink Radio Bearer (SLRB);
  determining a quantity of Radio Link Control (RLC) entities corresponding to the SLRB PDCP duplication according to the target information; and
  determining a Logic Channel Identifier (LCID) corresponding to each RLC entity according to the quantity of the RLC entities corresponding to the SLRB PDCP duplication.

The target information is at least one of:
SLRB configuration information sent by a network;
a first broadcast message sent by a network;
first pre-configuration information.

The target information includes at least one of:
PDCP duplication configuration indication information;
a quantity of RLC entities corresponding to a PDCP duplication;
a quantity of LCIDs corresponding to the PDCP duplication;
a primary RLC entity in the RLC entities corresponding to the PDCP duplication;
a secondary RLC entity in the RLC entities corresponding to the PDCP duplication;
a first corresponding relation between a QoS parameter of a sidelink communication interface and the quantity of RLC entities corresponding to the PDCP duplication;
a second corresponding relation between the QoS parameter and the quantity of LCIDs corresponding to the PDCP duplication;
a third corresponding relation between a QoS parameter threshold and the quantity of RLC entities corresponding to the PDCP duplication;
a fourth corresponding relation between the QoS parameter threshold and the quantity of LCIDs corresponding to the PDCP duplication;
a first association relation between each RLC entity corresponding to the PDCP duplication and a sidelink communication interface frequency.

The determining the LCID corresponding to each RLC entity according to the quantity of the RLC entities corresponding to the SLRB PDCP duplication includes:
  selecting a target LCID for a first RLC entity corresponding to the SLRB PDCP duplication;
  based on the target LCID and according to the association relation between LCIDs of RLC entities corresponding to the SLRB PDCP duplication, determining LCIDs corresponding to other RLC entities except the first RLC entity corresponding to the SLRB PDCP duplication.

The determining the LCID corresponding to each RLC entity according to the quantity of the RLC entities corresponding to the SLRB PDCP duplication includes:
  allocating a corresponding LCID for each RLC entity corresponding to the SLRB PDCP duplication.

The allocating the corresponding LCID for each RLC entity corresponding to the SLRB PDCP duplication includes:
  selecting the LCIDs with a same quantity as the RLC entities corresponding to the SLRB PDCP duplication from an available LCID set of a current sidelink communication interface;
  taking the LCIDs with the same quantity as the RLC entities corresponding to the SLRB PDCP duplication respectively as the LCID corresponding to each RLC entity corresponding to the SLRB PDCP duplication.

Subsequent to the allocating the corresponding LCID for each RLC entity corresponding to the SLRB PDCP duplication, the method further includes:
  sending a notification message to a second terminal which is directly communicated with the first terminal, where the notification message is configured to notify the second terminal of the LCID corresponding to each RLC entity corresponding to the SLRB PDCP duplication.

The notification message includes one of:
a media access control unit (MAC CE) of the sidelink communication interface;
a radio resource control (RRC) signaling of the sidelink communication interface;
a second broadcast message;
a data protocol data unit (PDU) header of the sidelink communication interface.

The notification message carries at least one of:
a source identification;
a target identification;
an SLRB identification or SLRB bit mapping information;
the LCID corresponding to each RLC entity corresponding to the SLRB PDCP duplication;
a primary RLC entity identification corresponding to the SLRB PDCP duplication;
an secondary RLC entity identification corresponding to the SLRB PDCP duplication;
a second association relation between each RLC entity corresponding to the SLRB PDCP duplication and a sidelink communication interface frequency.

The target information is SLRB configuration information sent by a network;
the obtaining the target information includes:
obtaining the SLRB configuration information of the SLRB through a RRC signaling when the first terminal is in a radio resource control connection (RRC_CONNECTED) state;
obtaining the SLRB configuration information of the SLRB through a third broadcast message when the first terminal is in a radio resource control idle (RRC_IDLE) state or a radio resource control inactive (RRC_INACTIVE) state; and
obtaining the SLRB configuration information of the SLRB through second pre-configuration information when the first terminal is in an off-line state.

In order to achieve the above object, an information processing method is provided in the present disclosure, applied to a second terminal and including:
obtaining a Logical Channel Identifier (LCD) corresponding to a Radio Link Control (RLC) entity corresponding to a Sidelink Radio Bearer (SLRB) which is configured with a Packet Data Convergence Protocol (PDCP) duplication between the second terminal and a first terminal;
when duplication data sent by the first terminal through the RLC entity corresponding to the SLRB PDCP duplication is received, determining target duplication data belonging to the same SLRB in the duplication data according to the LCID corresponding to the RLC entity corresponding to the SLRB PDCP duplication;
performing a preset processing on the target duplication data.

The obtaining the LCID corresponding to the RLC entity corresponding to the SLRB which is configured with the PDCP duplication between the second terminal and the first terminal includes:
determining the LCID corresponding to each RLC entity corresponding to the SLRB configured with the PDCP duplication between the second terminal and the first terminal, according to an association relation between the LCDs of the RLC entities corresponding to the SLRB PDCP duplication.

The obtaining the LCID corresponding to the RLC entity corresponding to the SLRB which is configured with the PDCP duplication between the second terminal and the first terminal includes:
obtaining the LCID corresponding to each RLC entity corresponding to the SLRB configured with the PDCP duplication between the second terminal and the first terminal, through a notification message sent by the first terminal, where the notification message is configured to notify the second terminal of the LCID corresponding to each RLC entity corresponding to the SLRB PDCP duplication.

The notification message includes one of:
a media access control unit (MAC CE) of the sidelink communication interface;
radio resource control, RRC, signaling of the sidelink communication interface;
a second broadcast message;
a data protocol data unit data PDU header of the sidelink communication interface.

The notification message carries at least one of:
a source identification;
a target identification;
an SLRB identification or SLRB bit mapping information;
the LCID corresponding to each RLC entity corresponding to the SLRB PDCP duplication;
a primary RLC entity identification corresponding to the SLRB PDCP duplication;
an secondary RLC entity identification corresponding to the SLRB PDCP duplication;
a second association relation between each RLC entity corresponding to the SLRB PDCP duplication and a sidelink communication interface frequency.

In order to achieve the above object, a terminal is provided in the present disclosure, where the terminal is a first terminal including: a transceiver, a memory, a processor, and a program stored in the memory and executable on the processor; where the processor is configured to read the program in the memory to:
obtain target information, where the target information is configured to configure a Packet Data Convergence Protocol (PDCP) duplication for a Sidelink Radio Bearer (SLRB);
determine a quantity of Radio Link Control (RLC) entities corresponding to the SLRB PDCP duplication according to the target information; and
determine a Logic Channel Identifier (LCID) corresponding to each RLC entity according to the quantity of the RLC entities corresponding to the SLRB PDCP duplication.

The target information is at least one of:
SLRB configuration information sent by a network;
a first broadcast message sent by a network;
first pre-configuration information.

The target information includes at least one of:
PDCP duplication configuration indication information;
a quantity of RLC entities corresponding to a PDCP duplication;
a quantity of LCIDs corresponding to the PDCP duplication;
a primary RLC entity in the RLC entities corresponding to the PDCP duplication;
a secondary RLC entity in the RLC entities corresponding to the PDCP duplication;
a first corresponding relation between a QoS parameter of a sidelink communication interface and the quantity of RLC entities corresponding to the PDCP duplication;
a second corresponding relation between the QoS parameter and the quantity of LCIDs corresponding to the PDCP duplication;
a third corresponding relation between a QoS parameter threshold and the quantity of RLC entities corresponding to the PDCP duplication;

a fourth corresponding relation between the QoS parameter threshold and the quantity of LCIDs corresponding to the PDCP duplication;
a first association relation between the LCID of the RLC entity corresponding to the PDCP duplication and a sidelink communication interface frequency.

The processor is further configured to:
select a target LCID for a first RLC entity corresponding to the SLRB PDCP duplication;
based on the target LCID and according to the association relation between LCIDs of RLC entities corresponding to the SLRB PDCP duplication, determine LCIDs corresponding to other RLC entities except the first RLC entity corresponding to the SLRB PDCP duplication.

The processor is further configured to:
allocate a corresponding LCID for each RLC entity corresponding to the SLRB PDCP duplication.

The processor is further configured to:
select the LCIDs with a same quantity as the RLC entities corresponding to the SLRB PDCP duplication from an available LCID set of a current sidelink communication interface;
take the LCIDs with the same quantity as the RLC entities corresponding to the SLRB PDCP duplication respectively as the LCID corresponding to each RLC entity corresponding to the SLRB PDCP duplication.

The transceiver is configured to:
send a notification message to a second terminal which is directly communicated with the first terminal, where the notification message is configured to notify the second terminal of the LCID corresponding to each RLC entity corresponding to the SLRB PDCP duplication.

The notification message includes one of:
a media access control unit (MAC CE) of the sidelink communication interface;
a radio resource control (RRC) signaling of the sidelink communication interface;
a second broadcast message;
a data protocol data unit (PDU) header of the sidelink communication interface.

The notification message carries at least one of:
a source identification;
a target identification;
an SLRB identification or SLRB bit mapping information;
the LCID corresponding to each RLC entity corresponding to the SLRB PDCP duplication;
a primary RLC entity identification corresponding to the SLRB PDCP duplication;
an secondary RLC entity identification corresponding to the SLRB PDCP duplication;
a second association relation between each RLC entity corresponding to the SLRB PDCP duplication and a sidelink communication interface frequency.

The target information is SLRB configuration information transmitted by a network, the processor is further configured to:
obtain the SLRB configuration information of the SLRB through a RRC signaling when the first terminal is in a radio resource control connection (RRC CONNECTED) state;
obtain the SLRB configuration information of the SLRB through a third broadcast message when the first terminal is in a radio resource control idle (RRC_IDLE) state or a radio resource control inactive (RRC_INACTIVE) state; and
obtain the SLRB configuration information of the SLRB through second pre-configuration information when the first terminal is in an off-line state.

In order to achieve the above object, a terminal is provided in the present disclosure, where the terminal is a first terminal and includes:
a first obtaining module, configured to obtain target information, where the target information is configured to configure a Packet Data Convergence Protocol (PDCP) duplication for a Sidelink Radio Bearer (SLRB);
a first processing module, configured to determine a quantity of Radio Link Control (RLC) entities corresponding to the SLRB PDCP duplication according to the target information;
a second processing module, configured to determine a Logic Channel Identifier (LCID) corresponding to each RLC entity according to the quantity of the RLC entities corresponding to the SLRB PDCP duplication.

In order to achieve the above object, a terminal is provided in the present disclosure, where the terminal is a second terminal and includes: a transceiver, a memory, a processor, and a program stored in the memory and executable on the processor, where the processor is configured to read the program in the memory to:
obtain a Logical Channel Identifier (LCD) corresponding to a Radio Link Control (RLC) entity corresponding to a Sidelink Radio Bearer (SLRB) which is configured with a Packet Data Convergence Protocol (PDCP) duplication between the second terminal and a first terminal;
when duplication data sent by the first terminal through the RLC entity corresponding to the SLRB PDCP duplication is received, determine target duplication data belonging to the same SLRB in the duplication data according to the LCID corresponding to the RLC entity corresponding to the SLRB PDCP duplication;
perform a preset processing on the target duplication data.

The processor is further configured to:
determine the LCID corresponding to each RLC entity corresponding to the SLRB configured with the PDCP duplication between the second terminal and the first terminal, according to an association relation between the LCIDs of the RLC entities corresponding to the SLRB PDCP duplication.

The processor is further configured to:
obtain the LCID corresponding to each RLC entity corresponding to the SLRB configured with the PDCP duplication between the second terminal and the first terminal, through a notification message sent by the first terminal, where the notification message is configured to notify the second terminal of the LCID corresponding to each RLC entity corresponding to the SLRB PDCP duplication.

The notification message includes one of:
a media access control unit (MAC CE) of the sidelink communication interface;
radio resource control, RRC, signaling of the sidelink communication interface;
a second broadcast message;
a data protocol data unit data PDU header of the sidelink communication interface.

The notification message carries at least one of:
a source identification;
a target identification;
an SLRB identification or SLRB bit mapping information;
the LCID corresponding to each RLC entity corresponding to the SLRB PDCP duplication;
a primary RLC entity identification corresponding to the SLRB PDCP duplication;
an secondary RLC entity identification corresponding to the SLRB PDCP duplication;
a second association relation between each RLC entity corresponding to the SLRB PDCP duplication and a sidelink communication interface frequency.

In order to achieve the above object, a terminal is provided in the present disclosure, where the terminal is a second terminal and includes:
a second obtaining module, configured to obtain a Logical Channel Identifier (LCID) corresponding to a Radio Link Control (RLC) entity corresponding to a Sidelink Radio Bearer (SLRB) which is configured with a Packet Data Convergence Protocol (PDCP) duplication between the second terminal and a first terminal;
a third processing module, configured to, when duplication data sent by the first terminal through the RLC entity corresponding to the SLRB PDCP duplication is received, determine target duplication data belonging to the same SLRB in the duplication data according to the LCID corresponding to the RLC entity corresponding to the SLRB PDCP duplication;
a fourth processing module configured to perform a preset processing on the target duplication data.

In order to achieve the above object, a computer-readable storage medium is provided in the present disclosure, storing a computer program, where the computer program is executed by a processor to perform the information processing method hereinabove.

The technical scheme of the present disclosure at least has the following beneficial effects:
according to the embodiment of the present disclosure, target information is obtained, where the target information is configured to configure a Packet Data Convergence Protocol (PDCP) duplication for a Sidelink Radio Bearer (SLRB); a quantity of Radio Link Control (RLC) entities corresponding to the SLRB PDCP duplication is determined according to the target information; and a Logic Channel Identifier (LCID) corresponding to each RLC entity is determined according to the quantity of the RLC entities corresponding to the SLRB PDCP duplication, so that the configuration of the SLRB can be configured by a network or preconfigured, and the duplication can be performed when the LCID is selected by a terminal, thereby improving the system performance.

DETAILED DESCRIPTION

To make the technical problems, technical solutions and advantages to be solved by the present disclosure clearer, the following detailed description is made with reference to the accompanying drawings and specific embodiments.

Figure 1:
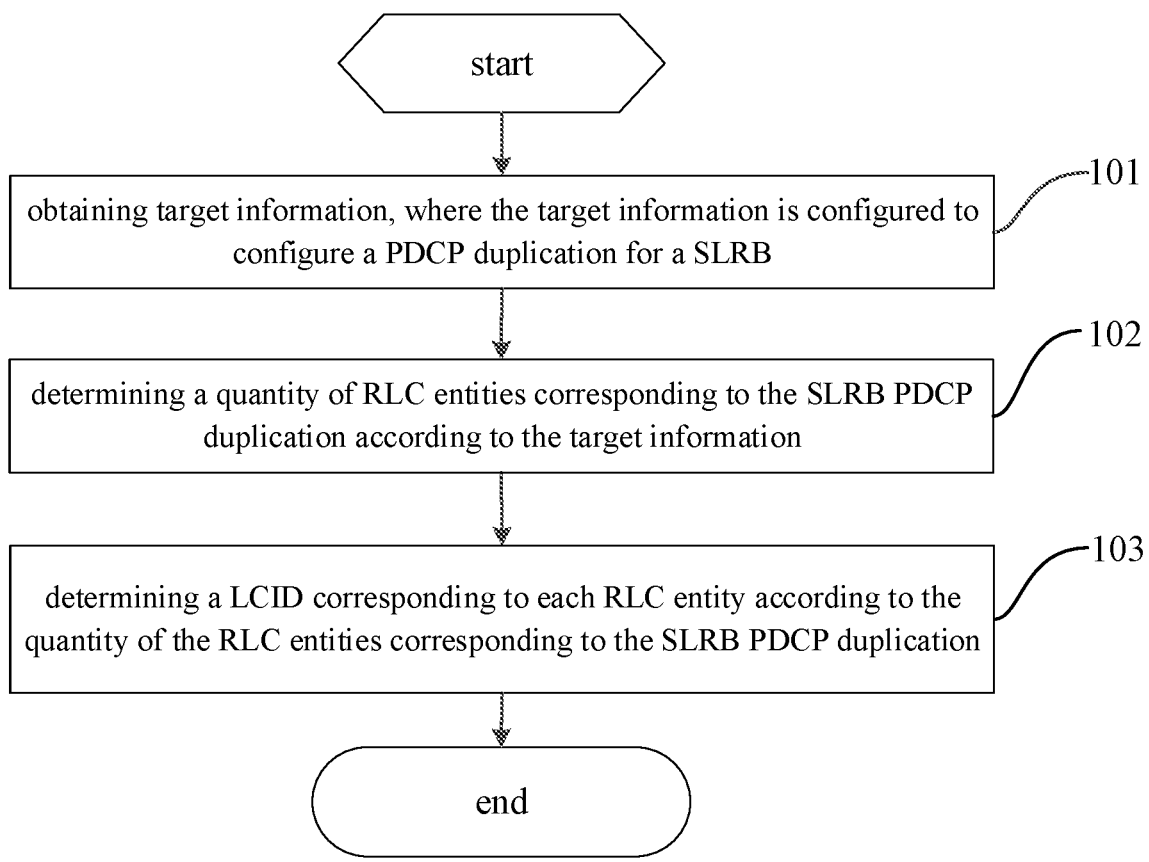
FIG. 1 is a schematic view of an information processing method according to an embodiment of the disclosure.

As shown in FIG. 1 which is a schematic view of an information processing method provided in the embodiment of the present disclosure which is applied to a first terminal and includes:
Step 101, obtaining target information, where the target information is configured to configure a Packet Data Convergence Protocol (PDCP) duplication for a Sidelink Radio Bearer (SLRB);
in this step, the first terminal acquires the target information, which indicates that the SLRB configures the PDCP duplication.
It should be noted that PDCP duplication is one radio bearer (corresponding to one PDCP entity) of the PDCP layer, and passes through multiple LCs in the RLC layer, where each LC corresponds to one RLC entity.
Step 102, determining a quantity of Radio Link Control (RLC) entities corresponding to the SLRB PDCP duplication according to the target information;
in this step, the target information includes the quantity of RLC entities corresponding to the PDCP duplication.
Step 103, determining a Logic Channel Identifier (LCID) corresponding to each RLC entity according to the quantity of the RLC entities corresponding to the SLRB PDCP duplication.

According to the embodiment of the present disclosure, target information is obtained, where the target information is configured to configure a Packet Data Convergence Protocol (PDCP) duplication for a Sidelink Radio Bearer (SLRB); a quantity of Radio Link Control (RLC) entities corresponding to the SLRB PDCP duplication is determined according to the target information; and a Logic Channel Identifier (LCID) corresponding to each RLC entity is determined according to the quantity of the RLC entities corresponding to the SLRB PDCP duplication, so that the configuration of the SLRB can be configured by a network or preconfigured, and the duplication can be performed when the LCID is selected by a terminal, thereby improving the system performance.

Optionally, the target information is at least one of the following information:
SLRB configuration information sent by a network;
a first broadcast message sent by a network;
first pre-configuration information.
It should be noted that, for a terminal in a radio resource control connection RRC_CONNECTED state, the target information is SLRB configuration information sent by the network; for a terminal in an IDLE Radio Resource Control (RRC)-IDLE state or an INACTIVE Radio Resource Control (RRC)-INACTIVE state, the target information is a first broadcast message sent by a network; for the terminal in the off-line state, the target information is first pre-configuration information.

The terminals in the above states may appear simultaneously, so that the target information is at least one of the above information.

Specifically, the target information includes at least one of the following:
  PDCP duplication configuration indication information;
  the quantity of RLC entities corresponding to the PDCP duplication;
  the quantity of LCIDs corresponding to the PDCP duplication;
  a primary RLC entity in the RLC entities corresponding to the PDCP duplication;
  a secondary RLC entity in the RLC entities corresponding to the PDCP
  a first corresponding relation between the QoS parameter of the sidelink communication interface and the quantity of RLC entities corresponding to the PDCP duplication;
  a second corresponding relation between the QoS parameters and the quantity of LCIDs corresponding to the PDCP duplication;
  a third corresponding relation between the QoS parameter threshold and the quantity of RLC entities corresponding to the PDCP duplication;
  a fourth corresponding relation between the QoS parameter threshold and the quantity of LCIDs corresponding to the PDCP duplication;
  a first association relation between each RLC entity corresponding to the PDCP duplication and the sidelink communication interface frequency.

It should be noted that the first association relationship specifically refers to a corresponding relationship between each RLC entity and a sidelink communication interface frequency that can be used. That is, those frequencies are specified that each RLC entity can use those frequencies. Specific frequencies can be indicated by using a bandwidth Part (BWP), Sub-carrier Space (SC S), carrier, and the like.

As an alternative implementation, step 103 of the method of the present disclosure may include:
  selecting a target LCID for a first RLC entity corresponding to the SLRB PDCP duplication;
  based on the target LCID and according to the association relation between LCIDs of RLC entities corresponding to the SLRB PDCP duplication, determining LCIDs corresponding to other RLC entities except the first RLC entity corresponding to the SLRB PDCP duplication.

In the implementation manner, the first terminal only needs to allocate one LCID for the SLRB by itself, namely, a target LCID is selected for the first RLC entity corresponding to the SLRB PDCP duplication; once the LCID of the first RLC entity is determined, the LCIDs of other RLC entities may be determined according to the association relationship between the LCIDs of the RLC entities corresponding to the SLRB PDCP duplication agreed by the protocol.

For example, LCID=00001 corresponding to the first RLC entity, and the quantity of the most supported SLRBs under one source/destination address combination is agreed to be 10 by the protocol, if the quantity of the RLC entities corresponding to the SLRB PDCP duplication is 3, and the LCID interval of the different RLC entities used by each SLRB is 10, the LCIDs of the other 2 RLC entities may be 01011 and 10101, respectively.

Certainly, the association relationship between the LCIDs of the RLC entities corresponding to the SLRB PDCP extension is not limited to protocol agreement, and other manners, such as pre-configuration, may be used, which is not specifically limited herein.

As another alternative implementation, the disclosed method step 103 may include:
  allocating a corresponding LCID for each RLC entity corresponding to the SLRB PDCP duplication.

Here, the step may specifically include:
  selecting the LCIDs with a same quantity as the RLC entities corresponding to the SLRB PDCP duplication from an available LCID set of a current sidelink communication interface;
  taking the LCIDs with the same quantity as the RLC entities corresponding to the SLRB PDCP duplication respectively as the LCID corresponding to each RLC entity corresponding to the SLRB PDCP duplication.

It should be noted that, compared to the LCID corresponding to each RLC entity corresponding to the SLRB PDCP extension determined by the protocol reservation, the implementation manner in which the terminal allocates the LCID to each RLC entity by itself is more flexible.

Based on this, in order to ensure that an opposite end of sidelink communication with the first terminal, that is, the second terminal, can correctly process data transmitted on different RLC entities of the same SLRB, as an optional implementation manner, after allocating a corresponding LCID to each RLC entity corresponding to the SLRB PDCP duplication, the method of the present disclosure may further include:
  sending a notification message to a second terminal which is directly communicated with the first terminal, where the notification message is configured to notify the second terminal of the LCID corresponding to each RLC entity corresponding to the SLRB PDCP duplication.

Optionally, the notification message includes one of:
  a media access control unit (MAC CE) of the sidelink communication interface;
  a radio resource control (RRC) signaling of the sidelink communication interface;
  a second broadcast message;
  a data protocol data unit (PDU) header of the sidelink communication interface.

It should be noted that the content of the second broadcast message is different from the content of the first broadcast message.

Optionally, the notification message carries at least one of the following messages:
  a source identification;
  a target identification;
  an SLRB identification or SLRB bit mapping information;
  the LCID corresponding to each RLC entity corresponding to the SLRB PDCP duplication;
  a primary RLC entity identification corresponding to the SLRB PDCP duplication;
  an secondary RLC entity identification corresponding to the SLRB PDCP duplication;
  a second association relation between each RLC entity corresponding to the SLRB PDCP duplication and a sidelink communication interface frequency.

It should be noted that the second association relationship specifically refers to a corresponding relationship between each RLC entity and a sidelink communication interface frequency that can be used. That is, those frequencies are specified that each RLC entity can use. Specific frequencies can be indicated by using a bandwidth Part (BWP), Sub-carrier Space (SC S), carrier, and the like.

As an optional implementation manner, the target information is SLRB configuration information sent by a network; step 101 of the method of the present disclosure may specifically include:

obtaining the SLRB configuration information of the SLRB through a RRC signaling when the first terminal is in a radio resource control connection (RRC CONNECTED) state;

obtaining the SLRB configuration information of the SLRB through a third broadcast message when the first terminal is in a radio resource control idle (RRC_IDLE) state or a radio resource control inactive (RRC_INACTIVE) state; and obtaining the SLRB configuration information of the SLRB through second pre-configuration information when the first terminal is in an off-line state Here, the content of the third broadcast message is different from the content of the second broadcast message.

The following examples specifically illustrate the implementation of the method of the present disclosure.

Figure 2:
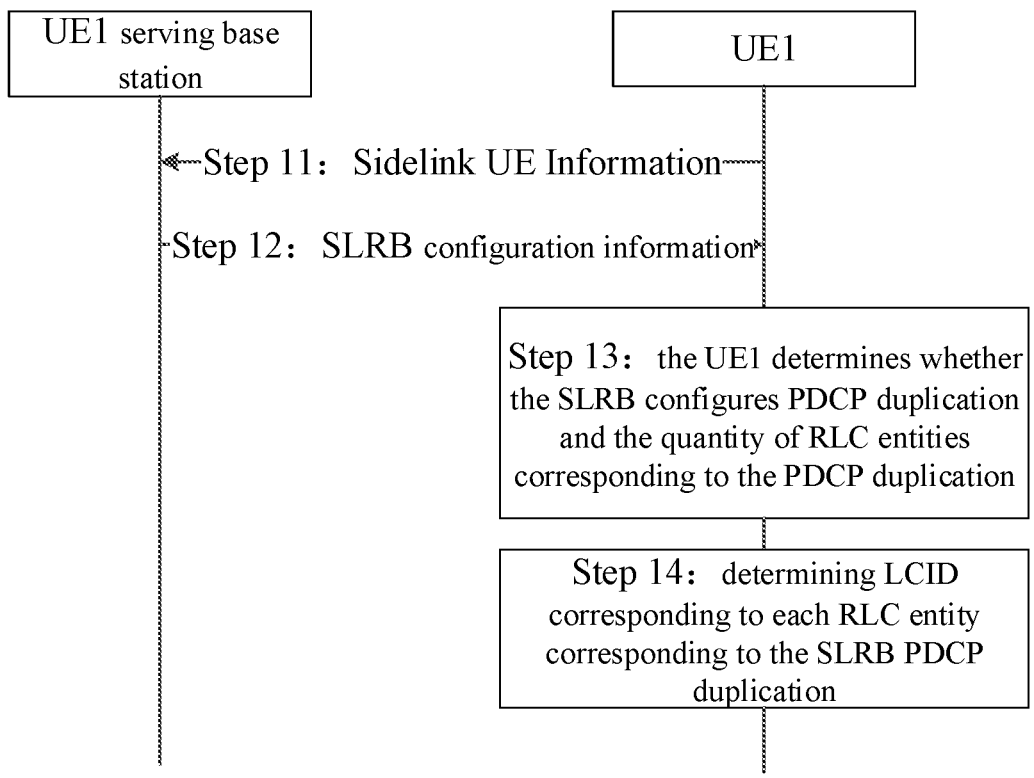
FIG. 2 is a second schematic view of an information processing method according to an embodiment of the disclosure.

As an example, as shown in FIG. 2, the target information is SLRB configuration information sent by the network, where the SLRB configuration information includes: PDCP duplication configuration indication information and the quantity of RLC entities corresponding to PDCP duplication Step 11: the UE1 reports the Sidelink UE Information to the serving base station;

it should be noted that the direct link terminal Information Sidelink UE Information message at least includes the content of the QoS parameter of the current QoS flow of the terminal UE 1. And judging whether the PDCP duplication and the quantity of RLC entities corresponding to the PDCP duplication need to be configured for the SLRB or not based on the QoS parameter.

Step 12: the UE1 serving base station transmits SLRB configuration information to UE 1;

here, the UE1 serving base station transmits SLRB configuration information to the UE1 through Radio Resource Control (RRC) signaling. The SLRB configuration information at least includes PDCP duplication configuration indication information and the quantity of RLC entities corresponding to the PDCP duplication. Further, the SLRB configuration information may further include an association relationship between each RLC entity corresponding to the PDCP extension and a sidelink communication interface frequency resource (e.g., BWP).

Step 13: the UE1 determines whether the SLRB configures PDCP duplication and the quantity of RLC entities corresponding to the PDCP duplication;

here, after receiving the SLRB configuration information transmitted by the serving base station, the UE1 determines that the SLRB configures PDCP duplication and the quantity of RLC entities corresponding to the PDCP duplication based on the SLRB configuration information.

Step 14: determining LCID corresponding to each RLC entity corresponding to the SLRB PDCP duplication.

The specific determination mode can be the following two modes:

the method I includes the following steps: the terminal only needs to allocate an LCID to the first RLC entity corresponding to the SLRB PDCP duplication, and the LCIDs of other RLC entities can be directly determined according to the association relation agreed by the protocol.

Specifically, the terminal selects an LCID for the first RLC entity corresponding to the SLRB PDCP duplication. Once the first LCID is determined, the LCIDs of other RLC entities can be determined according to the association relationship between the LCIDs of the RLC entities corresponding to different PDCP extensions predetermined by the protocol. For example, the protocol may stipulate that the first LCID=00001, and the quantity of the most supported SLRBs under one source/destination address combination is 10, if the quantity of RLC entities corresponding to SLRB PDCP duplication is 3, and the LCID interval of the different RLC entities used by each SLRB is 10, the LCIDs of the other 2 RLC entities may be 01011 and 10101, respectively.

Certainly, the association relationship between LCIDs of RLC entities corresponding to different PDCP extensions is not limited to protocol agreement, and other manners, such as pre-configuration, may be used, which is not specifically limited herein.

The second method includes the following steps: and the terminal allocates LCID for each RLC entity corresponding to the SLRB PDCP duplication respectively.

Specifically, the terminal may select, from the current LCID set available for the sidelink communication interface, LCIDs having the same number as the RLC entities corresponding to the SLRB PDCP duplication as the LCIDs of each RLC entity corresponding to the SLRB PDCP duplication.

It should be noted that, in this example, the UE1 is in the RRC_CONNECTED state. If the UE1 is in RRC_IDLE/INACTIVE state, step 11 is omitted. The SLRB configuration notification signaling in step 12 is System Information Block (SIB) signaling. If the UE1 is in the off-line state, step 12 requires no network participation and the terminal obtains the SLRB configuration directly from the pre-configuration information.

Figure 3:
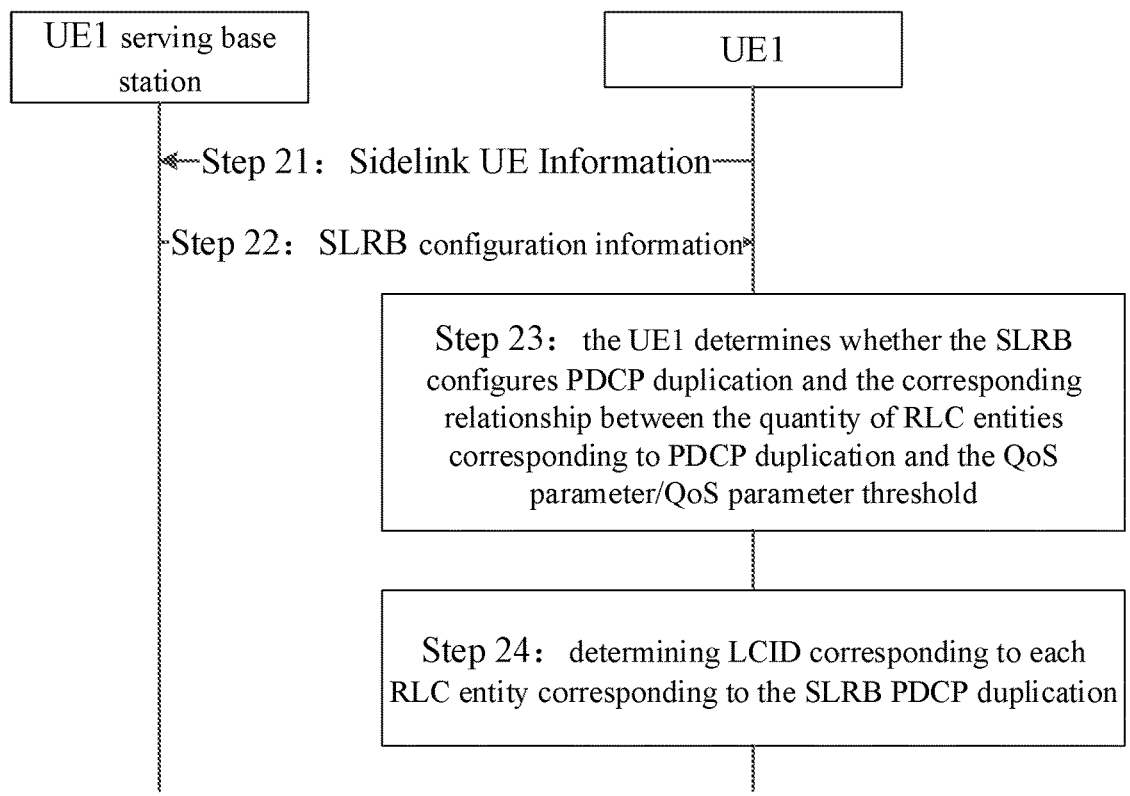
FIG. 3 is a third schematic view of an information processing method according to an embodiment of the disclosure.

In a second example, as shown in FIG. 3, the target information is SLRB configuration information sent by the network, where the SLRB configuration information includes: PDCP duplication configuration indication information and corresponding relation between RLC entity number corresponding to PDCP duplication and QoS parameter/QoS parameter threshold Step 21: the UE1 reports the Sidelink UE Information to the serving base station;

it should be noted that the Sidelink UE Information message at least includes the QoS parameters of the current QoS flow of the terminal UE1, and the like. And judging whether PDCP duplication is required to be configured for the SLRB or not based on the QoS parameter and judging the corresponding relation between the quantity of RLC entities corresponding to the PDCP duplication and the QoS parameter/QoS parameter threshold.

Step 22: the UE1 serving base station transmits SLRB configuration information to UE 1;

here, the UE1 serves SLRB configuration information that the base station transmits to the UE1 through RRC signaling. The SLRB configuration information at least includes PDCP duplication configuration indication information and the corresponding relation between the quantity of RLC entities corresponding to the PDCP duplication and a QoS parameter/QoS parameter threshold. Further, the SLRB configuration information may further include an association relationship between each RLC entity corresponding to the PDCP extension and a sidelink communication interface frequency domain resource (e.g., BWP).

Step 23: the UE1 determines whether the SLRB configures PDCP duplication and the corresponding relationship between the quantity of RLC entities corresponding to PDCP duplication and the QoS parameter/QoS parameter threshold;

here, after receiving the SLRB configuration information transmitted by the serving base station, the UE1 determines that the SLRB configures PDCP duplication according to the SLRB configuration information. And then, determining the quantity of RLC entities corresponding to the SLRB PDCP duplication according to the corresponding relation between the quantity of RLC entities corresponding to the PDCP duplication and the QoS parameter/QoS parameter threshold.

Step 24: determining LCID corresponding to each RLC entity corresponding to the SLRB PDCP duplication.

For a specific determination, reference may be made to the foregoing example one, which is not described herein again.

Figure 4:
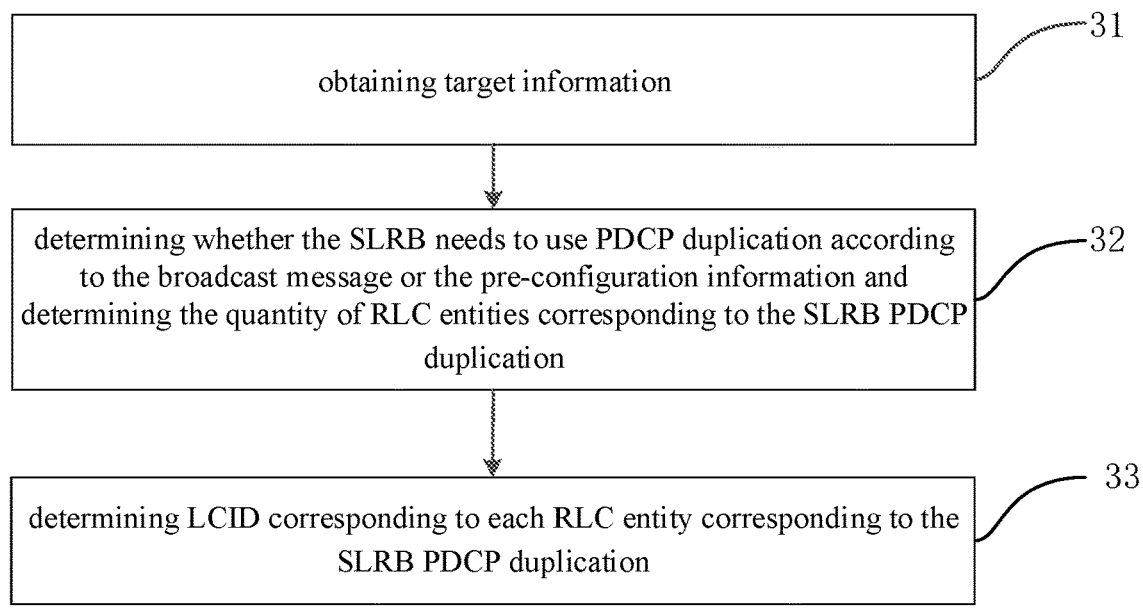
FIG. 4 is a fourth schematic view of an information processing method according to an embodiment of the disclosure.

In a third example, as shown in FIG. 4, the target information is preconfigured information or a broadcast message sent by the network, and the preconfigured information or the broadcast message includes a QoS parameter threshold for using PDCP duplication and a corresponding relationship between the quantity of RLC entities corresponding to PDCP duplication and the QoS parameter/QoS parameter threshold Step 31: obtaining target information;
if the UE1 is in RRC_IDLE/RRC_INACTIVE state, the QoS parameter threshold to use PDCP duplication broadcasted by the UE1 serving base station and the corresponding relationship between the quantity of RLC entities corresponding to PDCP duplication and the QoS parameter/QoS parameter threshold may be used. If the UE1 is in the off-line state, the pre-configuration information can be directly used to configure the QoS parameter threshold using PDCP duplication and the corresponding relationship between the quantity of RLC entities corresponding to PDCP duplication and the QoS parameter/QoS parameter threshold. Further, the SLRB configuration information may further include an association relationship between an RLC entity corresponding to each PDCP extension and a sidelink communication interface frequency domain resource (e.g., BWP).

Step 32, determining whether the SLRB needs to use PDCP duplication according to the broadcast message or the pre-configuration information and determining the quantity of RLC entities corresponding to the SLRB PDCP duplication;

it should be noted that, if the UE1 is in the RRC_IDLE/RRC_INACTIVE state, after receiving the SLRB configuration information sent by its serving base station, the UE1 determines whether the SLRB needs to use PDCP duplication according to the configuration in the broadcast message in step 31. If PDCP duplication needs to be used, the quantity of RLC entities corresponding to the SLRB PDCP duplication is further determined according to the correspondence between the quantity of RLC entities corresponding to the configured PDCP duplication in the broadcast message and the QoS parameter/QoS parameter threshold in step 31. If the UE1 is in the off-line state, it is determined whether the SLRB needs to use PDCP duplication according to the pre-configuration information in step 31. If PDCP duplication needs to be used, the quantity of RLC entities corresponding to the SLRB PDCP duplication is further determined according to the correspondence between the quantity of RLC entities corresponding to the configured PDCP duplication in the preconfigured information in step 31 and the QoS parameter/QoS parameter threshold.

Step 33: determining LCID corresponding to each RLC entity corresponding to the SLRB PDCP duplication.

For a specific determination, reference may be made to the foregoing example one, which is not described herein again.

In the information processing method of the embodiment of the disclosure, target information is acquired, and the target information is configured to configure Packet Data Convergence Protocol (PDCP) duplication for a sidelink radio bearer (SLRB); determining the quantity of Radio Link Control (RLC) entities corresponding to SLRB PDCP duplication according to the target information; and determining a Logical Channel Identifier (LCD) corresponding to each RLC entity according to the quantity of RLC entities corresponding to the SLRB PDCP duplication indication, so that the configuration of the SLRB can be configured by a network or preconfigured, and the LCID can be repeatedly transmitted by a sidelink communication interface when the LCID is selected by a terminal, thereby improving the system performance.

Figure 5:
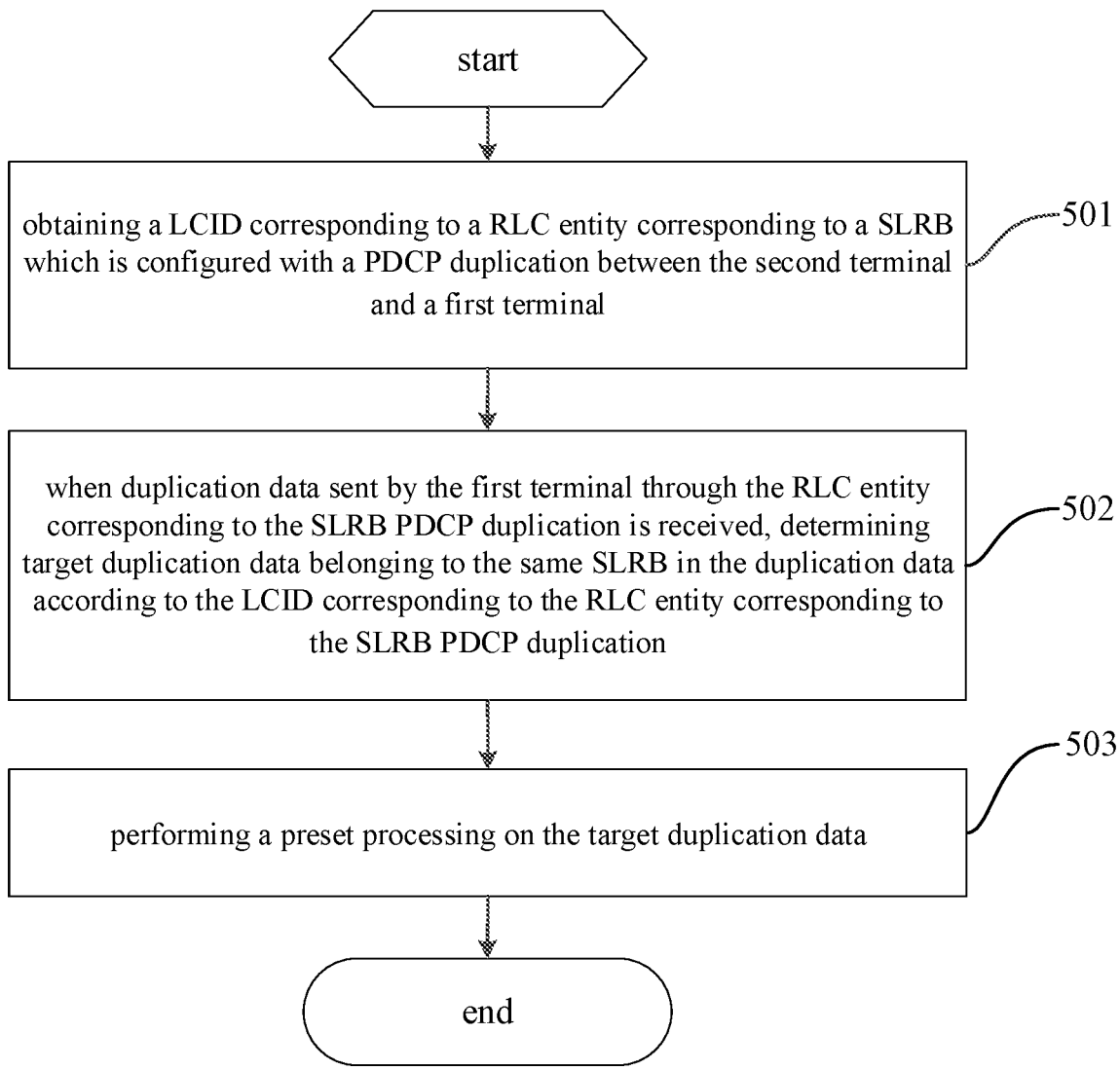
FIG. 5 is a fifth schematic view of an information processing method according to an embodiment of the disclosure.

As shown in FIG. 5, a schematic flow chart of the information processing method provided in the embodiment of the present disclosure is applied to a second terminal, where the second terminal is a direct terminal-to-terminal end of a first terminal. The method can include the following steps:

Step 501: obtaining a Logical Channel Identifier (LCID) corresponding to a Radio Link Control (RLC) entity corresponding to a Sidelink Radio Bearer (SLRB) which is configured with a Packet Data Convergence Protocol (PDCP) duplication between the second terminal and a first terminal;

Step 502: when duplication data sent by the first terminal through the RLC entity corresponding to the SLRB PDCP duplication is received, determining target duplication data belonging to the same SLRB in the duplication data according to the LCID corresponding to the RLC entity corresponding to the SLRB PDCP duplication;

in this step, the duplicate data belonging to the same SLRB can be found from the duplicate data sent by the first terminal through different SLRBs through the obtained LCID corresponding to the RLC entity corresponding to the SLRB PDCP duplication, so that it can be ensured that the second terminal correctly processes the data transmitted on the different RLC entities corresponding to the same SLRB PDCP duplication.

Step 503: performing a preset processing on the target duplication data.

In this step, the predetermined processing may include repeated detection and discarding.

In the information processing method of the embodiment of the present disclosure, by obtaining an LCID corresponding to an RLC entity corresponding to an SLRB to which a PDCP duplication is configured between the second terminal and the first terminal; under the condition of receiving duplication data sent by a first terminal through an RLC entity corresponding to the SLRB PDCP duplication, determining target duplication data belonging to the same SLRB in the duplication data according to the LCID corresponding to the RLC entity corresponding to the SLRB PDCP duplication; the target duplication data is subjected to preset processing, so that the SLRB configuration can be configured by a network or configured in advance, the sidelink communication interface is repeatedly transmitted when the LCID is selected by the terminal, the second terminal is ensured to correctly process the data transmitted on different RLC entities corresponding to the same SLRB PDCP duplication, and the data processing accuracy and efficiency are improved.

Based on the embodiment shown in FIG. 5, as an optional implementation manner, the steps 501 of the method of the present disclosure may further include:
  determining the LCID corresponding to each RLC entity corresponding to the SLRB configured with the PDCP duplication between the second terminal and the first terminal, according to an association relation between the LCDs of the RLC entities corresponding to the SLRB PDCP duplication.

Here, the first terminal directly communicating with the second terminal selects one LCID for the first RLC entity corresponding to the SLRB PDCP extension. Once the first LCID is determined, the LCIDs of other RLC entities can be determined according to the association relationship between the LCIDs of the RLC entities corresponding to different PDCP extensions predetermined by the protocol. For example, the protocol may stipulate that the first LCID=00001, and the quantity of the most supported SLRBs under one source/destination address combination is 10, if the quantity of RLC entities corresponding to SLRB PDCP duplication is 3, and the LCID interval of the different RLC entities used by each SLRB is 10, the LCIDs of the other 2 RLC entities may be 01011 and 10101, respectively. That is to say, the reception of these associated LCIDs by the second terminal determines that they are LCIDs corresponding to different RLC entities belonging to the same SLRB repeat transmission, so that the second terminal performs repeat detection and discard on these logical channels uniformly.

Certainly, the association relationship between LCIDs of RLC entities corresponding to different PDCP extensions is not limited to protocol agreement, and other manners, such as pre-configuration, may be used, which is not specifically limited herein.

As another optional implementation manner, the method step 501 of the present disclosure may further include:
  obtaining the LCID corresponding to each RLC entity corresponding to the SLRB configured with the PDCP duplication between the second terminal and the first terminal, through a notification message sent by the first terminal, where the notification message is configured to notify the second terminal of the LCID corresponding to each RLC entity corresponding to the SLRB PDCP duplication.

Optionally, the notification message includes one of:
  a media access control unit (MAC CE) of the sidelink communication interface;
  radio resource control, RRC, signaling of the sidelink communication interface;
  a second broadcast message;
  a data protocol data unit data PDU header of the sidelink communication interface.

Optionally, the notification message carries at least one of the following messages:
  a source identification;
  a target identification;
  an SLRB identification or SLRB bit mapping information;
  the LCID corresponding to each RLC entity corresponding to the SLRB PDCP duplication;
  a primary RLC entity identification corresponding to the SLRB PDCP duplication;
  an secondary RLC entity identification corresponding to the SLRB PDCP duplication;
  a second association relation between each RLC entity corresponding to the SLRB PDCP duplication and a sidelink communication interface frequency.

In the information processing method of the embodiment of the present disclosure, by obtaining an LCID corresponding to an RLC entity corresponding to an SLRB to which a PDCP duplication is configured between the second terminal and the first terminal; under the condition of receiving duplication data sent by a first terminal through an RLC entity corresponding to the SLRB PDCP duplication, determining target duplication data belonging to the same SLRB in the duplication data according to the LCID corresponding to the RLC entity corresponding to the SLRB PDCP duplication; the target duplication data is subjected to preset processing, so that the SLRB configuration can be configured by a network or configured in advance, the sidelink communication interface is repeatedly transmitted when the LCID is selected by the terminal, the second terminal is ensured to correctly process the data transmitted on different RLC entities corresponding to the same SLRB PDCP duplication, and the data processing accuracy and efficiency are improved.

Figure 6:
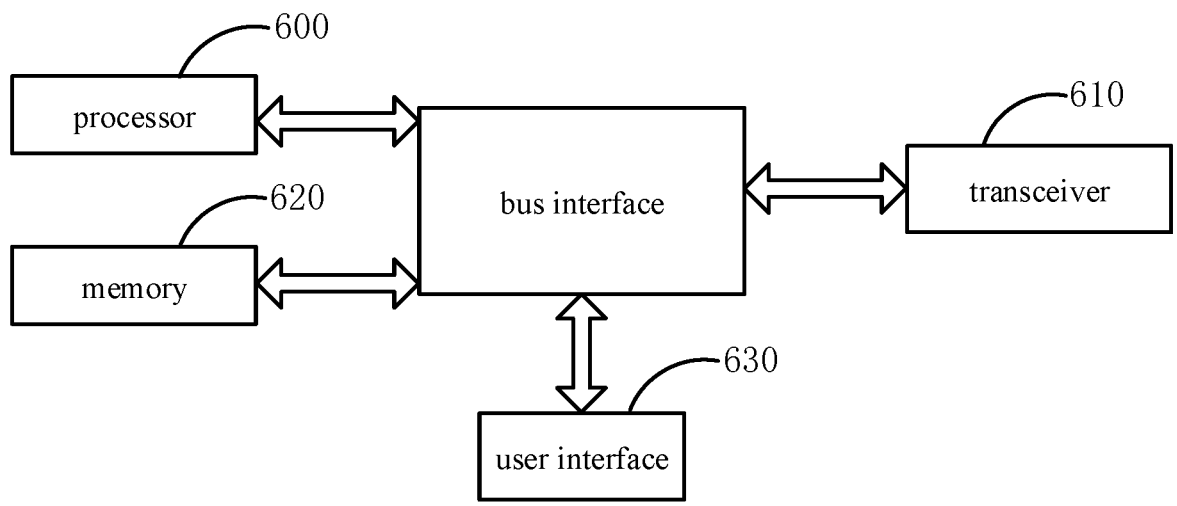
FIG. 6 is a schematic view of a terminal according to an embodiment of the disclosure.

As shown in FIG. 6, an embodiment of the present disclosure further provides a terminal, which is a first terminal, and includes a memory 620, a processor 600, a transceiver 610, a bus interface, and a program stored in the memory 620 and capable of running on the processor 600, where the processor 600 is configured to read the program in the memory 620 to:
  obtain target information, where the target information is configured to configure a Packet Data Convergence Protocol (PDCP) duplication for a Sidelink Radio Bearer (SLRB);
  determine a quantity of Radio Link Control (RLC) entities corresponding to the SLRB PDCP duplication according to the target information; and
  determine a Logic Channel Identifier (LCID) corresponding to each RLC entity according to the quantity of the RLC entities corresponding to the SLRB PDCP duplication.
  where in FIG. 6 the bus architecture may include any number of interconnected buses and bridges, with one or more processors, represented by processor 600, and various circuits, represented by memory 620, being linked together. The bus architecture may also link together various other circuits such as peripherals, voltage regulators, power management circuits, and the like, which are well known in the art, and therefore, will not be described any further herein. The bus interface provides an interface. The transceiver 610 may be a plurality of elements, including a transmitter and a transceiver, providing a means for communicating with various other apparatus over a transmission medium. For different user devices, the user interface 630 may also be an interface capable of interfacing externally to a desired device, including but not limited to a keypad, display, speaker, microphone, joystick, etc.

The processor 600 is responsible for managing the bus architecture and general processing, and the memory 620 may store data used by the processor 600 in performing operations.

Optionally, the target information is at least one of the following information:
 SLRB configuration information sent by a network;
 a first broadcast message sent by a network;
 first pre-configuration information.

Optionally, the target information includes at least one of:
 PDCP duplication configuration indication information;
 a quantity of RLC entities corresponding to a PDCP duplication;
 a quantity of LCIDs corresponding to the PDCP duplication;
 a primary RLC entity in the RLC entities corresponding to the PDCP duplication;
 a secondary RLC entity in the RLC entities corresponding to the PDCP duplication;
 a first corresponding relation between a QoS parameter of a sidelink communication interface and the quantity of RLC entities corresponding to the PDCP duplication;
 a second corresponding relation between the QoS parameter and the quantity of LCIDs corresponding to the PDCP duplication;
 a third corresponding relation between a QoS parameter threshold and the quantity of RLC entities corresponding to the PDCP duplication;
 a fourth corresponding relation between the QoS parameter threshold and the quantity of LCIDs corresponding to the PDCP duplication;
 a first association relation between the LCID of the RLC entity corresponding to the PDCP duplication and a sidelink communication interface frequency.

Optionally, the processor 600 is further configured to:
 select a target LCID for a first RLC entity corresponding to the SLRB PDCP duplication;
 based on the target LCID and according to the association relation between LCIDs of RLC entities corresponding to the SLRB PDCP duplication, determine LCIDs corresponding to other RLC entities except the first RLC entity corresponding to the SLRB PDCP duplication.

Optionally, the processor 600 is further configured to:
 allocate a corresponding LCID for each RLC entity corresponding to the SLRB PDCP duplication.

Optionally, the processor 600 is further configured to:
 select the LCIDs with a same quantity as the RLC entities corresponding to the SLRB PDCP duplication from an available LCID set of a current sidelink communication interface;
 take the LCIDs with the same quantity as the RLC entities corresponding to the SLRB PDCP duplication respectively as the LCID corresponding to each RLC entity corresponding to the SLRB PDCP duplication.

Optionally, the transceiver 610 is configured to:
 send a notification message to a second terminal which is directly communicated with the first terminal, where the notification message is configured to notify the second terminal of the LCID corresponding to each RLC entity corresponding to the SLRB PDCP duplication.

Optionally, the notification message includes one of:
 a media access control unit (MAC CE) of the sidelink communication interface;
 a radio resource control (RRC) signaling of the sidelink communication interface;
 a second broadcast message;
 a data protocol data unit (PDU) header of the sidelink communication interface.

Optionally, the notification message carries at least one of the following messages:
 a source identification;
 a target identification;
 an SLRB identification or SLRB bit mapping information;
 the LCID corresponding to each RLC entity corresponding to the SLRB PDCP duplication;
 a primary RLC entity identification corresponding to the SLRB PDCP
 an secondary RLC entity identification corresponding to the SLRB PDCP duplication;
 a second association relation between each RLC entity corresponding to the SLRB PDCP duplication and a sidelink communication interface frequency.

Optionally, the target information is SLRB configuration information sent by a network; the processor 600 is further configured to:
 obtain the SLRB configuration information of the SLRB through a RRC signaling when the first terminal is in a radio resource control connection (RRC CONNECTED) state;
 obtain the SLRB configuration information of the SLRB through a third broadcast message when the first terminal is in a radio resource control idle (RRC_IDLE) state or a radio resource control inactive (RRC_INACTIVE) state; and
 obtain the SLRB configuration information of the SLRB through second pre-configuration information when the first terminal is in an off-line state.

The embodiment of the present disclosure also provides a terminal, and as the principle of solving the problem of the terminal is similar to the information processing method in the embodiment of the present disclosure, the implementation of the terminal may refer to the implementation of the method, and the repeated parts are not described again.

The terminal of the embodiment of the present disclosure, by obtaining target information, the target information is configured to configure packet data convergence protocol (SLRB) repeat transmission PDCP duplication for a sidelink communication interface radio bearer; determining the quantity of Radio Link Control (RLC) entities corresponding to SLRB PDCP duplication according to the target information; and determining a Logical Channel Identifier (LCID) corresponding to each RLC entity according to the quantity of RLC entities corresponding to the SLRB PDCP duplication indication, so that the configuration of the SLRB can be configured by a network or preconfigured, and the LCID can be repeatedly transmitted by a sidelink communication interface when the LCID is selected by a terminal, thereby improving the system performance.

It should be noted that, the terminal provided in the embodiments of the present disclosure is a terminal capable of executing the information processing method, and all embodiments of the information processing method are applicable to the terminal and can achieve the same or similar beneficial effects.

Figure 7:
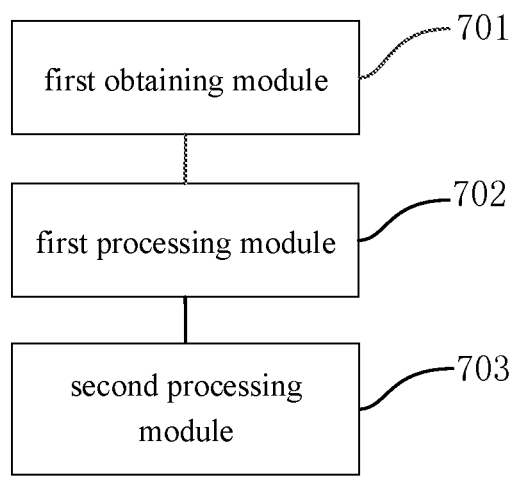
FIG. 7 is a block diagram of a terminal according to an embodiment of the present disclosure.

As shown in FIG. 7, an embodiment of the present disclosure further provides a terminal, where the terminal is a first terminal, and the terminal includes:

a first obtaining module 701, configured to obtain target information, where the target information is configured to configure a Packet Data Convergence Protocol (PDCP) duplication for a Sidelink Radio Bearer (SLRB);

a first processing module 702, configured to determine a quantity of Radio Link Control (RLC) entities corresponding to the SLRB PDCP duplication according to the target information;

a second processing module 703, configured to determine a Logic Channel Identifier (LCID) corresponding to each RLC entity according to the quantity of the RLC entities corresponding to the SLRB PDCP duplication.

Optionally, the target information is at least one of the following information:
SLRB configuration information sent by a network;
a first broadcast message sent by a network;
first pre-configuration information.

Optionally, the target information includes at least one of:
PDCP duplication configuration indication information;
a quantity of RLC entities corresponding to a PDCP duplication;
a quantity of LCIDs corresponding to the PDCP duplication;
a primary RLC entity in the RLC entities corresponding to the PDCP duplication;
a secondary RLC entity in the RLC entities corresponding to the PDCP duplication;
a first corresponding relation between a QoS parameter of a sidelink communication interface and the quantity of RLC entities corresponding to the PDCP duplication;
a second corresponding relation between the QoS parameter and the quantity of LCIDs corresponding to the PDCP duplication;
a third corresponding relation between a QoS parameter threshold and the quantity of RLC entities corresponding to the PDCP duplication;
a fourth corresponding relation between the QoS parameter threshold and the quantity of LCIDs corresponding to the PDCP duplication;
a first association relation between each RLC entity corresponding to the PDCP duplication and a sidelink communication interface frequency.

Optionally, the second processing module 703 may include:
a selecting unit, configured to select a target LCID for a first RLC entity corresponding to the SLRB PDCP duplication;
a first processing unit, configured to, based on the target LCID and according to the association relation between LCIDs of RLC entities corresponding to the SLRB PDCP duplication, determine LCIDs corresponding to other RLC entities except the first RLC entity corresponding to the SLRB PDCP duplication.

Optionally, the second processing module 703 may include:
a second processing unit, configured to allocate a corresponding LCID to each RLC entity corresponding to the SLRB PDCP duplication.

Optionally, the second processing unit is specifically configured to:
selecting LCIDs with the same number as RLC entities corresponding to the SLRB PDCP duplication indication from an available LCID set of a current sidelink communication interface;
respectively taking LCIDs with the same number as the RLC entities corresponding to the SLRB PDCP duplication as LCIDs corresponding to each RLC entity corresponding to the SLRB PDCP duplication.

Optionally, the terminal may further include:
a sending module, configured to send a notification message to a second terminal in sidelink communication with a first terminal, where the notification message is used to notify the second terminal of the LCID corresponding to each RLC entity corresponding to the SLRB PDCP duplication.

Optionally, the notification message includes one of:
a media access control unit (MAC CE) of the sidelink communication interface;
a radio resource control (RRC) signaling of the sidelink communication interface;
a second broadcast message;
a data protocol data unit (PDU) header of the sidelink communication interface.

Optionally, the notification message carries at least one of the following messages:
a source identification;
a target identification;
an SLRB identification or SLRB bit mapping information;
the LCID corresponding to each RLC entity corresponding to the SLRB PDCP duplication;
a primary RLC entity identification corresponding to the SLRB PDCP duplication;
an secondary RLC entity identification corresponding to the SLRB PDCP duplication;
a second association relation between each RLC entity corresponding to the SLRB PDCP duplication and a sidelink communication interface frequency.

Optionally, the target information is SLRB configuration information sent by a network;
accordingly, the first obtaining module 701 may include:
a first obtaining unit, configured to obtain the SLRB configuration information of the SLRB through a RRC signaling when the first terminal is in a radio resource control connection (RRC_CONNECTED) state;
a second obtaining unit, configured to obtain the SLRB configuration information of the SLRB through a third broadcast message when the first terminal is in a radio resource control idle (RRC_IDLE) state or a radio resource control inactive (RRC_INACTIVE) state;
a third obtaining unit, configured to obtain the SLRB configuration information of the SLRB through second pre-configuration information when the first terminal is in an off-line state.

The embodiment of the present disclosure also provides a terminal, and as the principle of solving the problem of the terminal is similar to the information processing method in the embodiment of the present disclosure, the implementation of the terminal may refer to the implementation of the method, and the repeated parts are not described again.

The terminal of the embodiment of the present disclosure acquires target information through a first acquisition module, where the target information is configured to configure a packet data convergence protocol for a sidelink communication interface radio bearer SLRB to repeatedly transmit a PDCP duplication; the first processing module determines the quantity of Radio Link Control (RLC) entities corresponding to the SLRB PDCP duplication according to the target information; the second processing module determines a Logical Channel Identifier (LCID) corresponding to each RLC entity according to the quantity of RLC entities corresponding to the SLRB PDCP duplication indication, so that the configuration of the SLRB can be configured by a network or preconfigured, the LCID is repeatedly transmitted by a sidelink communication interface when the LCID is selected by a terminal, and the system performance is improved.

It should be noted that, the terminal provided in the embodiments of the present disclosure is a terminal capable of executing the information processing method, and all embodiments of the information processing method are applicable to the terminal and can achieve the same or similar beneficial effects.

In some embodiments of the present disclosure, there is also provided a computer readable storage medium having stored thereon a computer program which when executed by a processor performs the steps of:
obtain target information, where the target information is configured to configure a Packet Data Convergence Protocol (PDCP) duplication for a Sidelink Radio Bearer (SLRB);
determine a quantity of Radio Link Control (RLC) entities corresponding to the SLRB PDCP duplication according to the target information; and
determine a Logic Channel Identifier (LCID) corresponding to each RLC entity according to the quantity of the RLC entities corresponding to the SLRB PDCP duplication.

When executed by the processor, the program can implement all the implementation manners applied to the method embodiment at the first terminal side shown in FIG. 1 to FIG. 4, and is not described herein again to avoid repetition.

Figure 8:
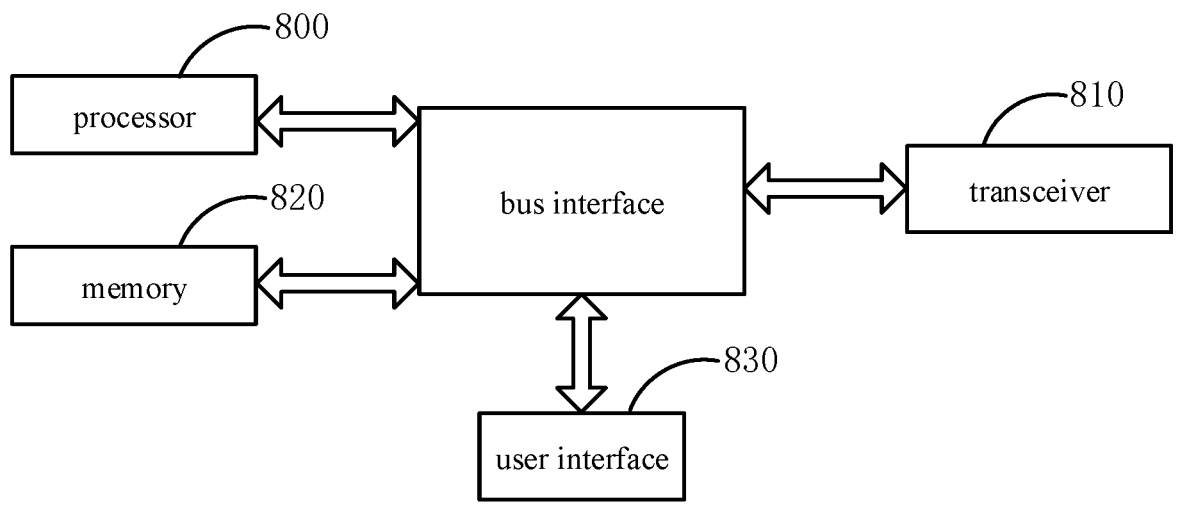
FIG. 8 is a second structural diagram of the terminal according to the embodiment of the present disclosure.

As shown in FIG. 8, an embodiment of the present disclosure further provides a terminal, where the terminal is a second terminal, and the terminal includes: a transceiver 810, a memory 820, a processor 800 and a program stored in the memory and executable on the processor, the processor 800 being configured to read the program from the memory 820 and execute the following processes:
obtain a Logical Channel Identifier (LCD) corresponding to a Radio Link Control (RLC) entity corresponding to a Sidelink Radio Bearer (SLRB) which is configured with a Packet Data Convergence Protocol (PDCP) duplication between the second terminal and a first terminal;
when duplication data sent by the first terminal through the RLC entity corresponding to the SLRB PDCP duplication is received, determine target duplication data belonging to the same SLRB in the duplication data according to the LCID corresponding to the RLC entity corresponding to the SLRB PDCP duplication;
perform a preset processing on the target duplication data.
where in FIG. 8 the bus architecture may include any number of interconnected buses and bridges, with one or more processors represented by processor 800 and various circuits of memory represented by memory 820 being linked together. The bus architecture may also link together various other circuits such as peripherals, voltage regulators, power management circuits, and the like, which are well known in the art, and therefore, will not be described any further herein. The bus interface provides an interface. The transceiver 810 may be a number of elements, including a transmitter and a transceiver, providing a means for communicating with various other apparatus over a transmission medium. The user interface 830 may also be an interface capable of interfacing externally to a desired device for different user devices, including but not limited to a keypad, display, speaker, microphone, joystick, etc.

The processor 800 is responsible for managing the bus architecture and general processing, and the memory 820 may store data used by the processor 800 in performing operations.

Optionally, the processor 800 is further configured to:
determine the LCID corresponding to each RLC entity corresponding to the SLRB configured with the PDCP duplication between the second terminal and the first terminal, according to an association relation between the LCIDs of the RLC entities corresponding to the SLRB PDCP duplication.

Optionally, the processor 800 is further configured to:
obtain the LCID corresponding to each RLC entity corresponding to the SLRB configured with the PDCP duplication between the second terminal and the first terminal, through a notification message sent by the first terminal, where the notification message is configured to notify the second terminal of the LCID corresponding to each RLC entity corresponding to the SLRB PDCP duplication.

Optionally, the notification message includes one of:
a media access control unit (MAC CE) of the sidelink communication interface;
radio resource control, RRC, signaling of the sidelink communication interface;
a second broadcast message;
a data protocol data unit data PDU header of the sidelink communication interface.

Optionally, the notification message carries at least one of the following messages:
a source identification;
a target identification;
an SLRB identification or SLRB bit mapping information;
the LCID corresponding to each RLC entity corresponding to the SLRB PDCP duplication;
a primary RLC entity identification corresponding to the SLRB PDCP duplication;
an secondary RLC entity identification corresponding to the SLRB PDCP duplication;
a second association relation between each RLC entity corresponding to the SLRB PDCP duplication and a sidelink communication interface frequency.

The embodiment of the present disclosure also provides a terminal, and as the principle of solving the problem of the terminal is similar to the information processing method in the embodiment of the present disclosure, the implementation of the terminal may refer to the implementation of the method, and the repeated parts are not described again.

The terminal of the embodiment of the present disclosure obtains the LCID corresponding to the RLC entity corresponding to the SLRB configured with PDCP duplication between the second terminal and the first terminal; under the condition of receiving duplication data sent by a first terminal through an RLC entity corresponding to the SLRB PDCP duplication, determining target duplication data belonging to the same SLRB in the duplication data according to the LCID corresponding to the RLC entity corresponding to the SLRB PDCP duplication; the target duplication data is subjected to preset processing, so that the SLRB configuration can be configured by a network or configured in advance, the sidelink communication interface is repeatedly transmitted when the LCID is selected by the terminal, the second terminal is ensured to correctly process the data transmitted on different RLC entities corresponding to the same SLRB PDCP duplication, and the data processing accuracy and efficiency are improved.

It should be noted that, the terminal provided in the embodiments of the present disclosure is a terminal capable of executing the information processing method, and all embodiments of the information processing method are applicable to the terminal and can achieve the same or similar beneficial effects.

Figure 9:
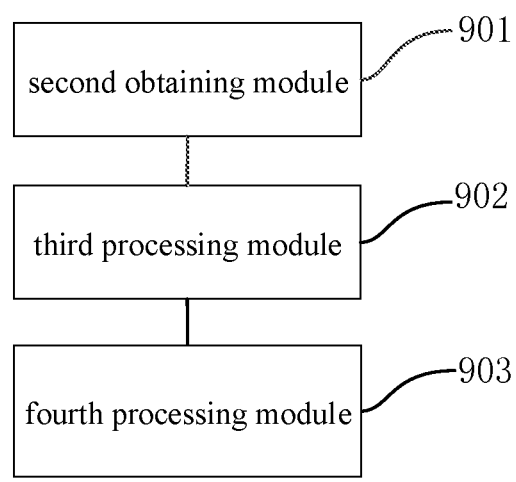
FIG. 9 is a second block diagram of a terminal according to the second embodiment of the disclosure.

As shown in FIG. 9, the present disclosure further provides a terminal, where the terminal is a second terminal, and the terminal includes:
a second obtaining module 901, configured to obtain a Logical Channel Identifier (LCID) corresponding to a Radio Link Control (RLC) entity corresponding to a Sidelink Radio Bearer (SLRB) which is configured with a Packet Data Convergence Protocol (PDCP) duplication between the second terminal and a first terminal;
a third processing module 902, configured to, when duplication data sent by the first terminal through the RLC entity corresponding to the SLRB PDCP duplication is received, determine target duplication data belonging to the same SLRB in the duplication data according to the LCID corresponding to the RLC entity corresponding to the SLRB PDCP duplication;
a fourth processing module 903 configured to perform a preset processing on the target duplication data.

Optionally, the second obtaining module 901 may include:
a fourth obtaining unit, configured to determine the LCID corresponding to each RLC entity corresponding to the SLRB configured with the PDCP duplication between the second terminal and the first terminal, according to an association relation between the LCIDs of the RLC entities corresponding to the SLRB PDCP duplication.

Optionally, the second obtaining module 901 may include:
a fifth obtaining unit, configured to obtain the LCID corresponding to each RLC entity corresponding to the SLRB configured with the PDCP duplication between the second terminal and the first terminal, through a notification message sent by the first terminal, where the notification message is configured to notify the second terminal of the LCID corresponding to each RLC entity corresponding to the SLRB PDCP duplication.

Optionally, the notification message includes one of:
a media access control unit (MAC CE) of the sidelink communication interface;
radio resource control, RRC, signaling of the sidelink communication interface;
a second broadcast message;
a data protocol data unit data PDU header of the sidelink communication interface.

Optionally, the notification message carries at least one of the following messages:
a source identification;
a target identification;
an SLRB identification or SLRB bit mapping information;
the LCID corresponding to each RLC entity corresponding to the SLRB PDCP duplication;
a primary RLC entity identification corresponding to the SLRB PDCP duplication;
an secondary RLC entity identification corresponding to the SLRB PDCP duplication;
a second association relation between each RLC entity corresponding to the SLRB PDCP duplication and a sidelink communication interface frequency.

The embodiment of the present disclosure also provides a terminal, and as the principle of solving the problem of the terminal is similar to the information processing method in the embodiment of the present disclosure, the implementation of the terminal may refer to the implementation of the method, and the repeated parts are not described again.

According to the terminal of the embodiment, the LCID corresponding to the RLC entity corresponding to the SLRB configured with the PDCP duplication is acquired between the second terminal and the first terminal through the second acquisition module; the third processing module determines target duplication data belonging to the same SLRB in the duplication data according to the LCID corresponding to the RLC entity corresponding to the SLRB PDCP duplication when receiving the duplication data sent by the first terminal through the RLC entity corresponding to the SLRB PDCP duplication; the fourth processing module carries out preset processing on the target duplication data, so that the SLRB configuration can be configured by a network or configured in advance, the LCID is repeatedly transmitted by a sidelink communication interface when the LCID is selected by the terminal, the second terminal is ensured to correctly process data transmitted on different RLC entities corresponding to the same SLRB PDCP duplication, and the data processing accuracy and efficiency are improved.

It should be noted that, the terminal provided in the embodiments of the present disclosure is a terminal capable of executing the foregoing information processing method, and all embodiments of the foregoing resource selection processing method are applicable to the terminal and can achieve the same or similar beneficial effects.

In some embodiments of the present disclosure, there is also provided a computer readable storage medium having stored thereon a computer program which when executed by a processor performs the steps of:
obtain a Logical Channel Identifier (LCD) corresponding to a Radio Link Control (RLC) entity corresponding to a Sidelink Radio Bearer (SLRB) which is configured with a Packet Data Convergence Protocol (PDCP) duplication between the second terminal and a first terminal;
when duplication data sent by the first terminal through the RLC entity corresponding to the SLRB PDCP duplication is received, determine target duplication data belonging to the same SLRB in the duplication data according to the LCID corresponding to the RLC entity corresponding to the SLRB PDCP duplication;
perform a preset processing on the target duplication data.

When executed by the processor, the program may implement all the implementation manners in the embodiment of the method applied to the second terminal side shown in FIG. 5, and details are not described herein for avoiding repetition.

In various embodiments of the present disclosure, it should be understood that the sequence numbers of the above-mentioned processes do not imply an order of execution, and the order of execution of the processes should be determined by their functions and inherent logic, and should not constitute any limitation to the implementation processes of the embodiments of the present disclosure.

While the foregoing is directed to alternative embodiments of the present disclosure, it will be appreciated by those skilled in the art that various changes and modifications may be made therein without departing from the principles of the disclosure, and it is intended that such changes and modifications be covered by the scope of the disclosure.

What is claimed is:

1. An information processing method, applied to a first terminal and comprising:
    obtaining first information, wherein the first information is configured to configure a Packet Data Convergence Protocol (PDCP) duplication for a Sidelink Radio Bearer (SLRB);
    determining a quantity of Radio Link Control (RLC) entities corresponding to the SLRB PDCP duplication according to the first information; and
    determining a Logic Channel Identifier (LCID) corresponding to each RLC entity according to the quantity of the RLC entities corresponding to the SLRB PDCP duplication, wherein the determining comprises:
        selecting the LCIDs with a same quantity as the RLC entities corresponding to the SLRB PDCP duplication from an available LCID set of a current sidelink communication interface; and
        taking the LCIDs with the same quantity as the RLC entities corresponding to the SLRB PDCP duplication respectively as the LCID corresponding to each RLC entity corresponding to the SLRB PDCP duplication.

2. The method according to claim 1, wherein the first information is at least one of:
    SLRB configuration information sent by a network;
    a first broadcast message sent by a network;
    first pre-configuration information.

3. The method according to claim 1, wherein the first information comprises at least one of:
    PDCP duplication configuration information;
    a quantity of RLC entities corresponding to a PDCP duplication;
    a quantity of LCIDs corresponding to the PDCP duplication;
    a primary RLC entity in the RLC entities corresponding to the PDCP duplication;
    a secondary RLC entity in the RLC entities corresponding to the PDCP duplication;
    a first corresponding relation between a QoS parameter of a sidelink communication interface and the quantity of RLC entities corresponding to the PDCP duplication;
    a second corresponding relation between the QoS parameter and the quantity of LCIDs corresponding to the PDCP duplication;
    a third corresponding relation between a QoS parameter threshold and the quantity of RLC entities corresponding to the PDCP duplication;
    a fourth corresponding relation between the QoS parameter threshold and the quantity of LCIDs corresponding to the PDCP duplication;
    a first association relation between each RLC entity corresponding to the PDCP duplication and a sidelink communication interface frequency.

4. The method according to claim 1, wherein the determining the LCID corresponding to each RLC entity according to the quantity of the RLC entities corresponding to the SLRB PDCP duplication comprises:
    selecting a target LCID for a first RLC entity corresponding to the SLRB PDCP duplication;
    based on the target LCID and according to the association relation between LCIDs of RLC entities corresponding to the SLRB PDCP duplication, determining LCIDs corresponding to other RLC entities except the first RLC entity corresponding to the SLRB PDCP duplication.

5. The method according to claim 1, wherein the determining the LCID corresponding to each RLC entity according to the quantity of the RLC entities corresponding to the SLRB PDCP duplication comprises:
    allocating a corresponding LCID for each RLC entity corresponding to the SLRB PDCP duplication.

6. The method according to claim 5, wherein subsequent to the allocating the corresponding LCID for each RLC entity corresponding to the SLRB PDCP duplication, the method further comprises:
    sending a notification message to a second terminal which is directly communicated with the first terminal, wherein the notification message is configured to notify the second terminal of the LCID corresponding to each RLC entity corresponding to the SLRB PDCP duplication.

7. The method according to claim 6, wherein the notification message comprises one of:
    a media access control unit (MAC CE) of the sidelink communication interface;
    a radio resource control (RRC) signaling of the sidelink communication interface;
    a second broadcast message;
    a data protocol data unit (PDU) header of the sidelink communication interface.

8. The method according to claim 6, wherein the notification message carries at least one of:
    a source identification;
    a target identification;
    an SLRB identification or SLRB bit mapping information;
    the LCID corresponding to each RLC entity corresponding to the SLRB PDCP duplication;
    a primary RLC entity identification corresponding to the SLRB PDCP duplication;
    an secondary RLC entity identification corresponding to the SLRB PDCP duplication;
    a second association relation between each RLC entity corresponding to the SLRB PDCP duplication and a sidelink communication interface frequency.

9. The method according to claim 1, wherein the first information is SLRB configuration information sent by a network;
    the obtaining the first information comprises:
    obtaining the SLRB configuration information of the SLRB through a RRC signaling when the first terminal is in a radio resource control connection (RRC_CONNECTED) state;
    obtaining the SLRB configuration information of the SLRB through a third broadcast message when the first terminal is in a radio resource control idle (RRC_IDLE) state or a radio resource control inactive (RRC_INACTIVE) state; and
    obtaining the SLRB configuration information of the SLRB through second pre-configuration information when the first terminal is in an off-line state.

10. An information processing method, applied to a second terminal and comprising:
- obtaining a Logical Channel Identifier (LCID) corresponding to a Radio Link Control (RLC) entity corresponding to a Sidelink Radio Bearer (SLRB) which is configured with a Packet Data Convergence Protocol (PDCP) duplication between the second terminal and a first terminal;
- when duplication data sent by the first terminal through the RLC entity corresponding to the SLRB PDCP duplication is received, determining target duplication data belonging to the same SLRB in the duplication data according to the LCID corresponding to the RLC entity corresponding to the SLRB PDCP duplication;
- determining the LCID corresponding to each RLC entity corresponding to the SLRB configured with the PDCP duplication between the second terminal and the first terminal, according to an association relation between the LCIDs of the RLC entities corresponding to the SLRB PDCP duplication;
- obtaining the LCID corresponding to each RLC entity corresponding to the SLRB configured with the PDCP duplication between the second terminal and the first terminal, through a notification message sent by the first terminal, wherein the notification message is configured to notify the second terminal of the LCID corresponding to each RLC entity corresponding to the SLRB PDCP duplication; and
- performing a preset processing on the target duplication data.

11. The method according to claim 10, wherein the obtaining the LCID corresponding to the RLC entity corresponding to the SLRB which is configured with the PDCP duplication between the second terminal and the first terminal comprises:
- determining the LCID corresponding to each RLC entity corresponding to the SLRB configured with the PDCP duplication between the second terminal and the first terminal, according to an association relation between the LCIDs of the RLC entities corresponding to the SLRB PDCP duplication.

12. The method according to claim 10, wherein the obtaining the LCID corresponding to the RLC entity corresponding to the SLRB which is configured with the PDCP duplication between the second terminal and the first terminal comprises:
- obtaining the LCID corresponding to each RLC entity corresponding to the SLRB configured with the PDCP duplication between the second terminal and the first terminal, through a notification message sent by the first terminal, wherein the notification message is configured to notify the second terminal of the LCID corresponding to each RLC entity corresponding to the SLRB PDCP duplication.

13. The method according to claim 12, wherein the notification message comprises one of:
- a media access control unit (MAC CE) of the sidelink communication interface;
- radio resource control, RRC, signaling of the sidelink communication interface;
- a second broadcast message;
- a data protocol data unit data PDU header of the sidelink communication interface.

14. The method according to claim 13, wherein the notification message carries at least one of:
- a source identification;
- a target identification;
- an SLRB identification or SLRB bit mapping information;
- the LCID corresponding to each RLC entity corresponding to the SLRB PDCP duplication;
- a primary RLC entity identification corresponding to the SLRB PDCP duplication;
- an secondary RLC entity identification corresponding to the SLRB PDCP duplication;
- a second association relation between each RLC entity corresponding to the SLRB PDCP duplication and a sidelink communication interface frequency.

15. A terminal, wherein the terminal is a first terminal comprising: a transceiver, a memory, a processor, and a program stored in the memory and executable on the processor; wherein the processor is configured to read the program in the memory to:
- obtain first information, wherein the first information is configured to configure a Packet Data Convergence Protocol (PDCP) duplication for a Sidelink Radio Bearer (SLRB);
- determine a quantity of Radio Link Control (RLC) entities corresponding to the SLRB PDCP duplication according to the first information; and
- determine a Logic Channel Identifier (LCID) corresponding to each RLC entity according to the quantity of the RLC entities corresponding to the SLRB PDCP duplication, wherein the determining comprises:
  - selecting the LCIDs with a same quantity as the RLC entities corresponding to the SLRB PDCP duplication from an available LCID set of a current sidelink communication interface; and
  - taking the LCIDs with the same quantity as the RLC entities corresponding to the SLRB PDCP duplication respectively as the LCID corresponding to each RLC entity corresponding to the SLRB PDCP duplication.

16. The terminal according to claim 15, wherein the first information is at least one of:
- SLRB configuration information sent by a network;
- a first broadcast message sent by a network;
- first pre-configuration information;
- or
the first information comprises at least one of:
- PDCP duplication configuration information;
- a quantity of RLC entities corresponding to a PDCP duplication;
- a quantity of LCIDs corresponding to the PDCP duplication;
- a primary RLC entity in the RLC entities corresponding to the PDCP duplication;
- a secondary RLC entity in the RLC entities corresponding to the PDCP duplication;
- a first corresponding relation between a QoS parameter of a sidelink communication interface and the quantity of RLC entities corresponding to the PDCP duplication;
- a second corresponding relation between the QoS parameter and the quantity of LCIDs corresponding to the PDCP duplication;
- a third corresponding relation between a QoS parameter threshold and the quantity of RLC entities corresponding to the PDCP duplication;

a fourth corresponding relation between the QoS parameter threshold and the quantity of LCIDs corresponding to the PDCP duplication;
a first association relation between the LCID of the RLC entity corresponding to the PDCP duplication and a sidelink communication interface frequency;
or
the processor is further configured to:
select a target LCID for a first RLC entity corresponding to the SLRB PDCP duplication;
based on the target LCID and according to the association relation between LCIDs of RLC entities corresponding to the SLRB PDCP duplication, determine LCIDs corresponding to other RLC entities except the first RLC entity corresponding to the SLRB PDCP duplication;
or
the processor is further configured to:
allocate a corresponding LCID for each RLC entity corresponding to the SLRB PDCP duplication;
or
the first information is SLRB configuration information transmitted by a network, the processor is further configured to:
obtain the SLRB configuration information of the SLRB through a RRC signaling when the first terminal is in a radio resource control connection (RRC_CONNECTED) state;
obtain the SLRB configuration information of the SLRB through a third broadcast message when the first terminal is in a radio resource control idle (RRC_IDLE) state or a radio resource control inactive (RRC_INACTIVE) state; and
obtain the SLRB configuration information of the SLRB through second pre-configuration information when the first terminal is in an off-line state.

17. The terminal according to claim 15, wherein
the transceiver is configured to:
send a notification message to a second terminal which is directly communicated with the first terminal, wherein the notification message is configured to notify the second terminal of the LCID corresponding to each RLC entity corresponding to the SLRB PDCP duplication;
wherein the notification message comprises one of:
a media access control unit (MAC CE) of the sidelink communication interface;
a radio resource control (RRC) signaling of the sidelink communication interface;
a second broadcast message;
a data protocol data unit (PDU) header of the sidelink communication interface;
the notification message carries at least one of:
a source identification;
a target identification;
an SLRB identification or SLRB bit mapping information;
the LCID corresponding to each RLC entity corresponding to the SLRB PDCP duplication;
a primary RLC entity identification corresponding to the SLRB PDCP duplication;
an secondary RLC entity identification corresponding to the SLRB PDCP duplication;
a second association relation between each RLC entity corresponding to the SLRB PDCP duplication and a sidelink communication interface frequency.

18. A terminal, wherein the terminal is a second terminal and comprises: a transceiver, a memory, a processor, and a program stored in the memory and executable on the processor, wherein the processor is configured to read the program in the memory to perform the information processing method according to claim 10.

19. The terminal according to claim 18,
wherein the notification message comprises one of:
a media access control unit (MAC CE) of the sidelink communication interface;
radio resource control, RRC, signaling of the sidelink communication interface;
a second broadcast message;
a data protocol data unit data PDU header of the sidelink communication interface;
the notification message carries at least one of:
a source identification;
a target identification;
an SLRB identification or SLRB bit mapping information;
the LCID corresponding to each RLC entity corresponding to the SLRB PDCP duplication;
a primary RLC entity identification corresponding to the SLRB PDCP duplication;
an secondary RLC entity identification corresponding to the SLRB PDCP duplication;
a second association relation between each RLC entity corresponding to the SLRB PDCP duplication and a sidelink communication interface frequency.

* * * * *